United States Patent
Kringstad (10) Patent No.: US 9,555,676 B2
(45) Date of Patent: Jan. 31, 2017

(54) HYDRAULIC TOWING SYSTEM

(71) Applicant: Safe-T-Pull, Inc., Park River, ND (US)

(72) Inventor: Burnell R. Kringstad, Hoople, ND (US)

(73) Assignee: Safe-T-Pull, Inc., Park River, ND (US)

( * ) Notice: Subject to any disclaimer, the term of this patent is extended or adjusted under 35 U.S.C. 154(b) by 0 days.

(21) Appl. No.: 14/552,094

(22) Filed: Nov. 24, 2014

(65) Prior Publication Data

US 2016/0144678 A1     May 26, 2016

(51) Int. Cl.
  *B60D 1/36*     (2006.01)
  *B60D 1/46*     (2006.01)
  *B60D 1/24*     (2006.01)
  *B60D 1/02*     (2006.01)

(52) U.S. Cl.
  CPC ............... *B60D 1/465* (2013.01); *B60D 1/025* (2013.01); *B60D 1/246* (2013.01)

(58) Field of Classification Search
  CPC ... B60D 1/465; B60D 1/246; B60D 2001/001; B60D 1/025
  USPC ............................ 280/515, 514, 491.1, 491.3
  See application file for complete search history.

(56) References Cited

U.S. PATENT DOCUMENTS

| 2,375,970 | A | * | 5/1945 | Williams, Jr. | ......... | B60D 1/465 172/453 |
| 3,649,048 | A | * | 3/1972 | Garnett | .................. | B60D 1/249 280/416.1 |
| 4,702,489 | A | * | 10/1987 | Erickson | ................ | B60D 1/465 172/319 |
| 5,772,230 | A | * | 6/1998 | Kemnitz | .................. | B60D 1/02 280/479.1 |
| 6,871,868 | B2 | * | 3/2005 | Pogue | .................... | B60D 1/143 280/479.1 |

* cited by examiner

*Primary Examiner* — Tony Winner
(74) *Attorney, Agent, or Firm* — Neustal Law Offices; Michael S. Neustel (57) ABSTRACT

A hydraulic towing system for use with towing vehicles lacking hydraulics including a hydraulic housing which is mounted to a towing device. The hydraulic housing includes an internal compartment which stores a hydraulic system for controlling the towing device. A reservoir, pump, and control are used to control flow of hydraulic fluid through a plurality of hydraulic conduits. First and second hydraulic conduits are linked with a lift actuator which acts to transition the towing device between a lowered position for use and a raised position for storage. Third and fourth hydraulic conduits are linked with a catch actuator, which acts to mount the towing device to a towed vehicle by extending an engaging member to through a hitch of the towed vehicle. Thus, a self-contained hydraulic system may be provided for a towing device where the towing vehicle does not include its own hydraulic system.

15 Claims, 9 Drawing Sheets

HYDRAULIC TOWING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a hydraulic system and more specifically it relates to a hydraulic towing system for use with towing vehicles lacking hydraulics.

Description of the Related Art

Any discussion of the related art throughout the specification should in no way be considered as an admission that such related art is widely known or forms part of common general knowledge in the field.

Towing systems are commonly used with a wide range of towing vehicles. They can range from a simple winch to more complex systems which utilize hydraulics to advance or retract various towing connectors for linking the towing vehicle with the towed vehicle.

It has been shown through trial and effort that hydraulics are optimal for use in controlling a towing system to ensure that the towing vehicle and towed vehicle are firmly and safely connected to each other. Use of such hydraulics can ensure a tight connection that is less likely to be lost during towing efforts.

However, such systems are typically dependent on the towing vehicle already having a built-in hydraulic system to be connected to the towing system. Thus, the use of such hydraulic towing systems has, until now, been limited to use with towing vehicles incorporating their own hydraulic systems.

Because of the inherent problems with the related art, there is a need for a new and improved hydraulic towing system for use with towing vehicles lacking hydraulics.

BRIEF SUMMARY OF THE INVENTION

The invention generally relates to a hydraulic towing system which includes a hydraulic housing which is mounted to a towing device. The hydraulic housing includes an internal compartment which stores a hydraulic system for controlling the towing device. A reservoir, pump, and control are used to control flow of hydraulic fluid through a plurality of hydraulic conduits. First and second hydraulic conduits are linked with a lift actuator which acts to transition the towing device between a lowered position for use and a raised position for storage. Third and fourth hydraulic conduits are linked with a catch actuator which acts to mount the towing device to a towed vehicle by extending an engaging member to through a hitch of the towed vehicle. Thus, a self-contained hydraulic system may be provided for a towing device where the towing vehicle does not include its own hydraulic system.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7c illustrate a hydraulic towing system 10, which comprises a hydraulic housing 50 which is mounted to a towing device. The hydraulic housing 50 includes an internal compartment 52 which stores a hydraulic system for controlling the towing device. A reservoir 54, pump 55, and control 56 are used to control flow of hydraulic fluid through a plurality of hydraulic conduits 58a-d. First and second hydraulic conduits 58a,b are linked with a lift actuator 80 which acts to transition the towing device between a lowered position for use and a raised position for storage. Third and fourth hydraulic conduits 58c,d are linked with a catch actuator 71, which acts to mount the towing device to a towed vehicle 14 by extending an engaging member 77 to through a hitch 15 of the towed vehicle 14. Thus, a self-contained hydraulic system may be provided for a towing device where the towing vehicle 12 does not include its own hydraulic system.

B. Towing Device

As shown throughout the figures, the present invention includes a towing device which includes a first member 20, a second member 30, and a third member 40. The first member 20 is connected at a first end 21 to a towing vehicle 12 and at a second end 22 to the second member 30. The first member 20 is preferably attached to a drawbar 13 of a towing vehicle 12, but may be attached at various other locations to suit different applications. The first member 20 includes an a first aperture 23 which may be aligned with an aperture within the clevis of the drawbar 13; receiving a corresponding pin which extends through the drawbar 14 and the first member 20.

The first member 20 may be comprised of a variety of configurations and materials, but will preferably be comprised of a solid metal bar adapted to fit between the upper and lower portions of a clevis of the drawbar 13 as shown in the figures. The first member 20 preferably has a thickness that provides a relatively snug fit within the clevis of the drawbar 13 to reduce upward and downward movement of the first member 20. The first member 20 also preferably has a width approximately equal to the width of the clevis of the drawbar 13.

Figure 1:
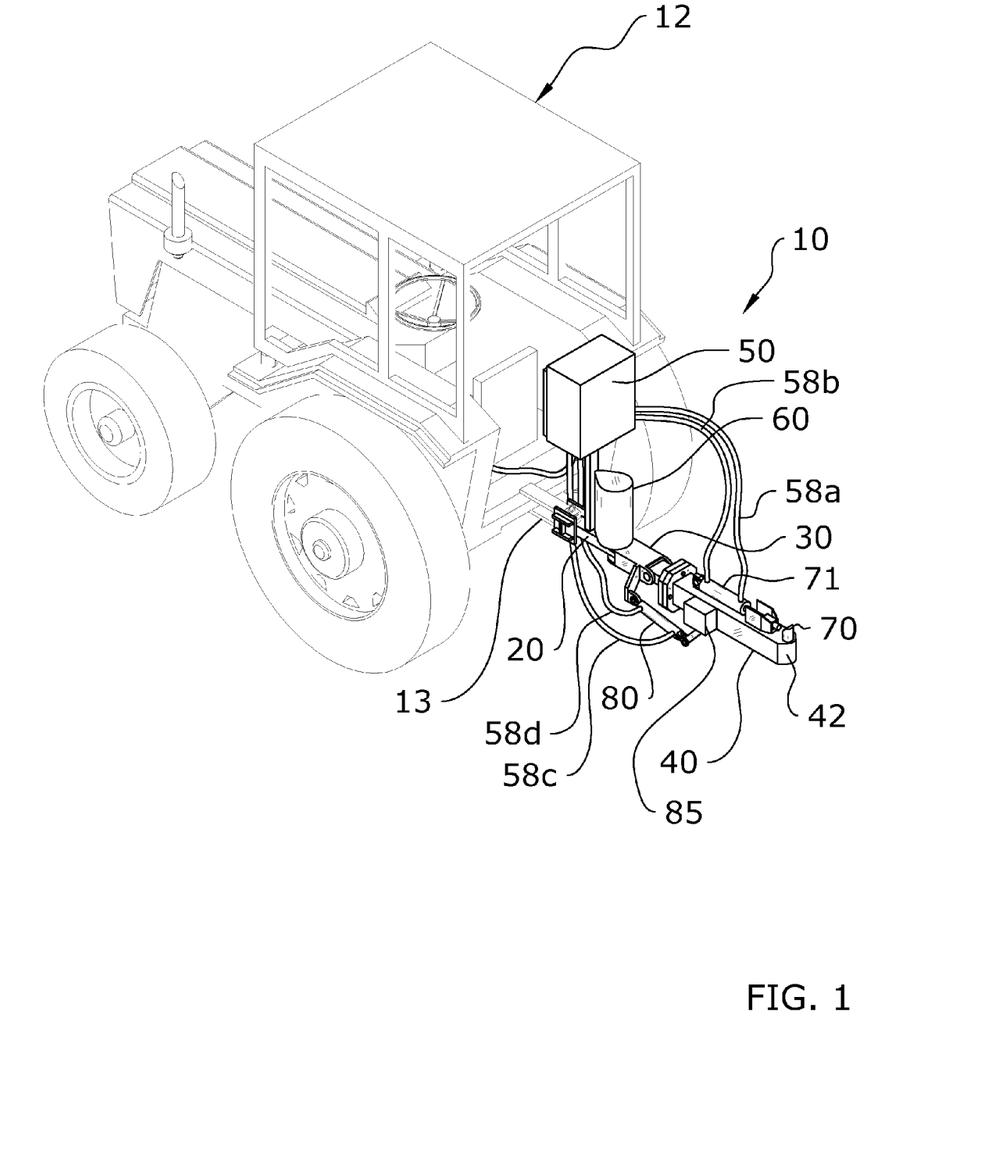
FIG. 1 is an upper perspective view of the present invention attached to a towing vehicle in a lowered position.
Figure 2:
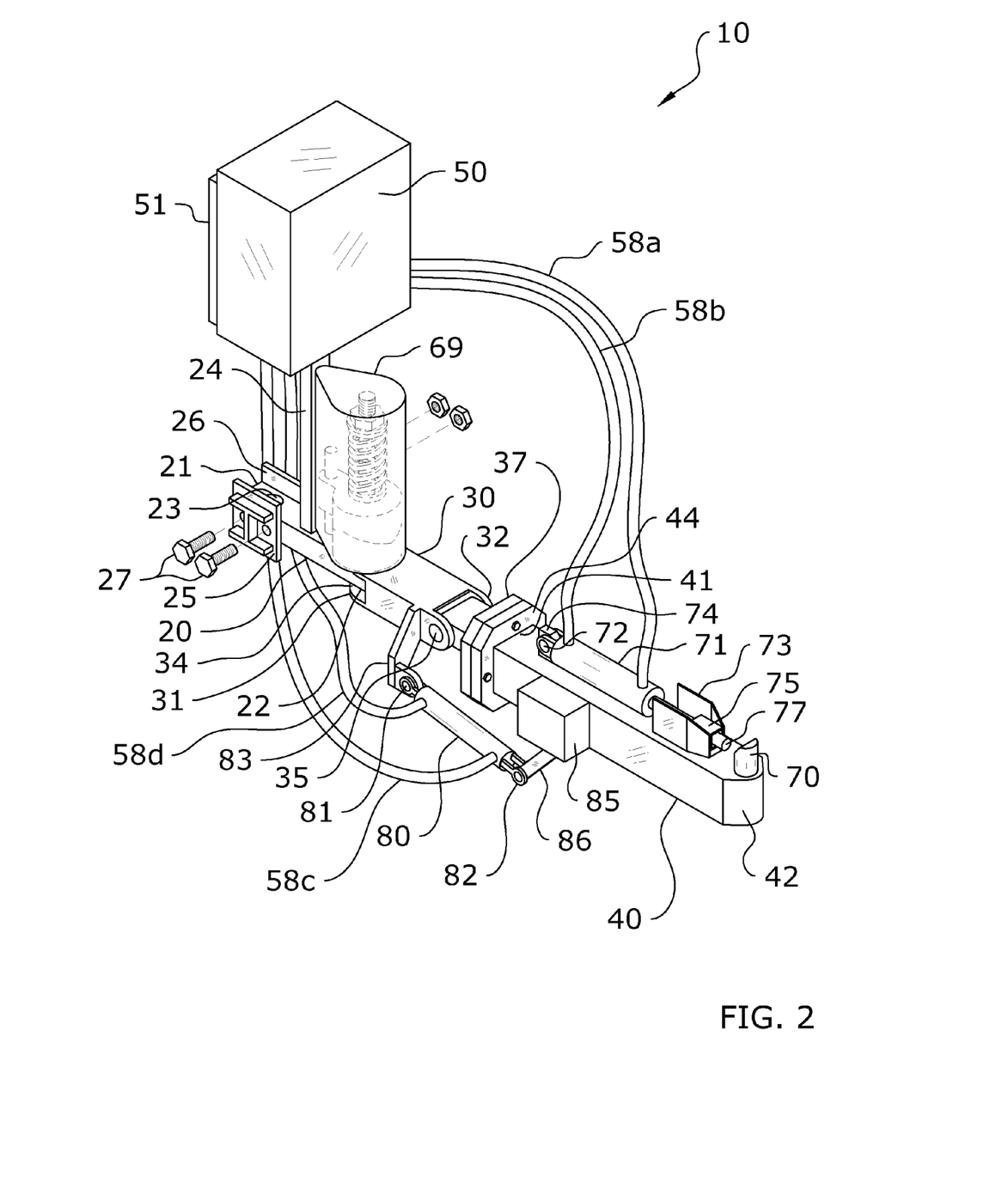
FIG. 2 is a frontal upper perspective view of the present invention in a lowered position.
Figure 3:
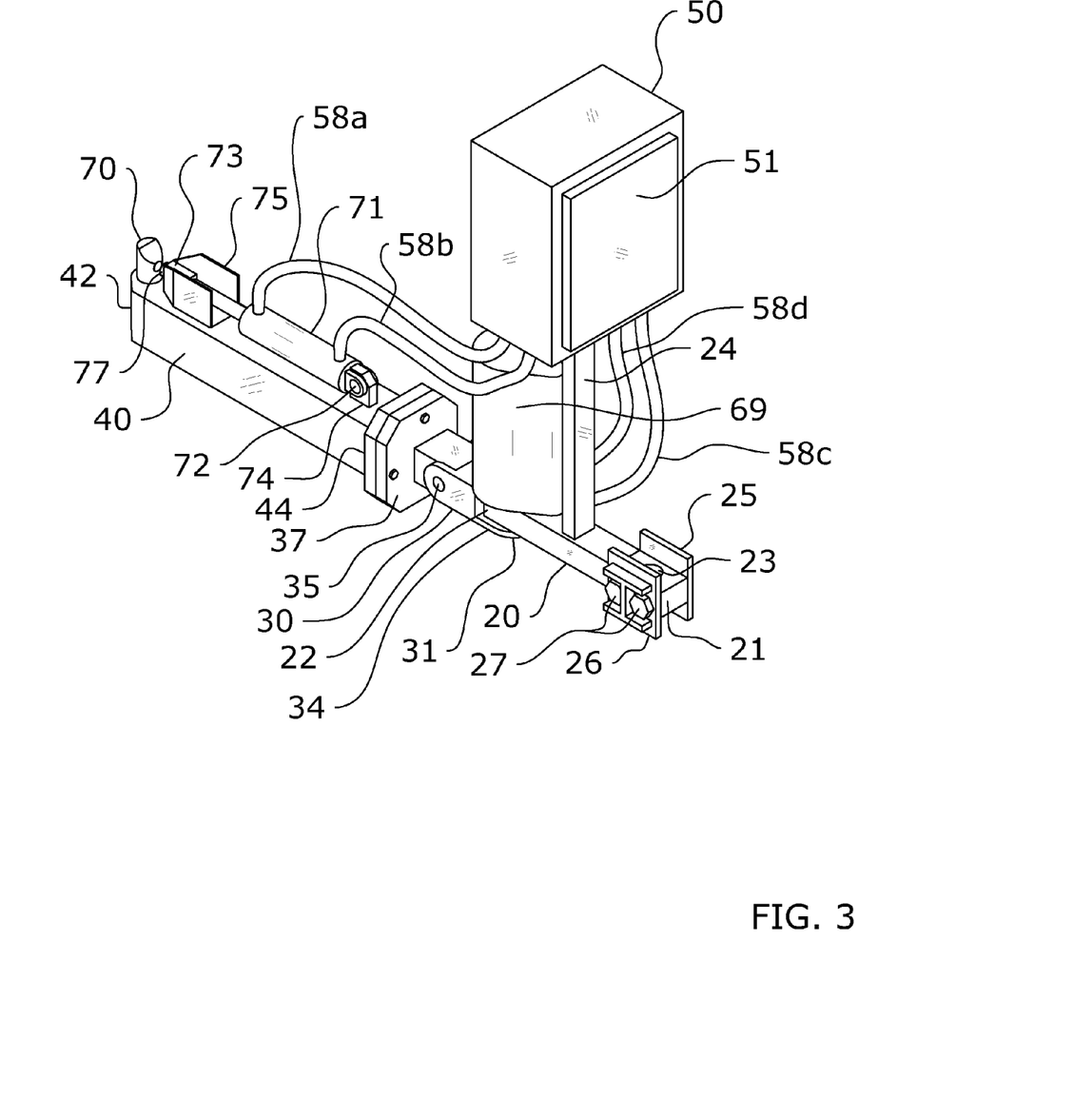
FIG. 3 is a rear upper perspective view of the present invention in a lowered position.
Figure 4:
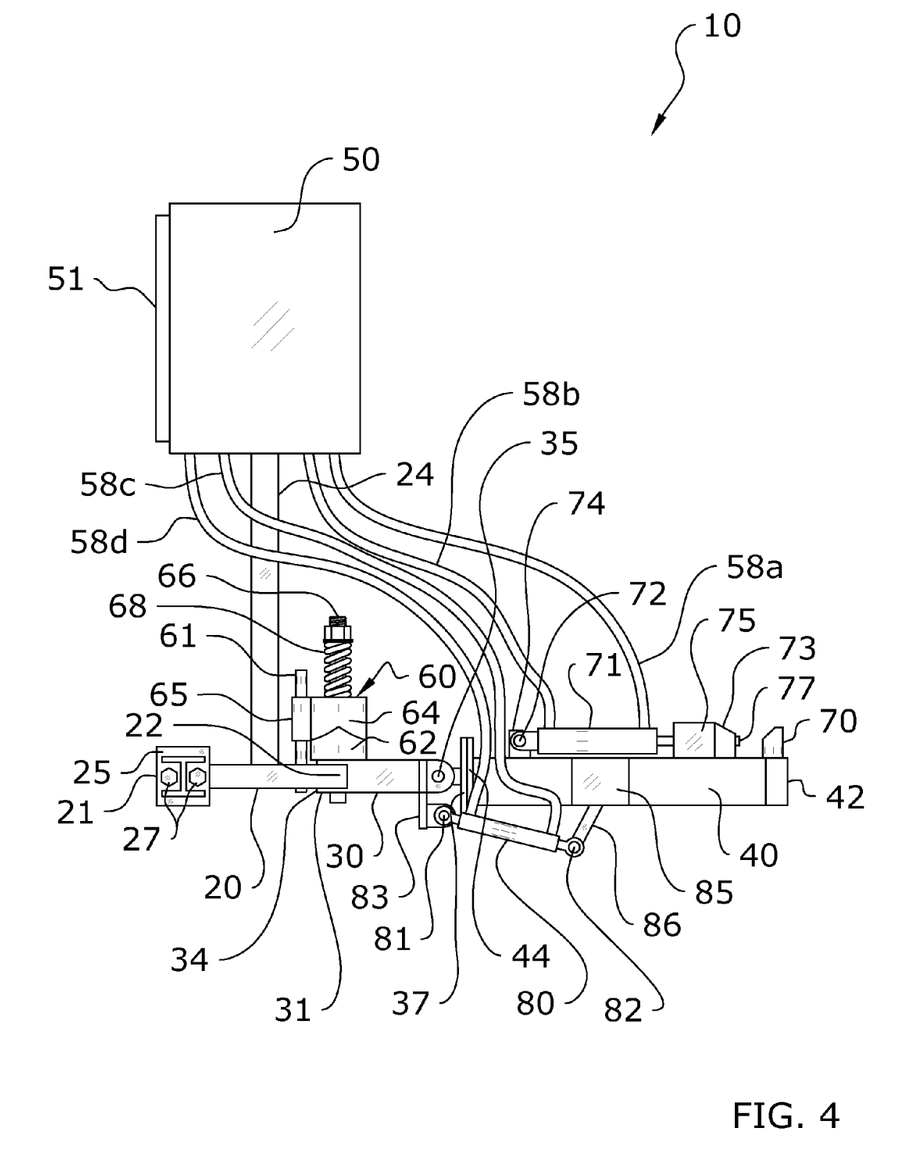
FIG. 4 is a side view of the present invention in a lowered position.

The first member 20 is preferably connected to the drawbar 13 in a substantially non-movable manner to prevent side-to-side movement of the first member 20. A first plate 25 and a second plate 26 are adapted to be secured on opposite sides of the first member 20 and adjacent to the drawbar 13 to prevent movement of the first member 20 with respect to the drawbar 13 of the towing vehicle 12 as shown in the figures. The first and second plates 25, 26 are parallel to one another on a vertical plane as illustrated in FIGS. 2-4.

The first and second plates 25, 26 may be permanently or removably attached to the first member 20. If the first plate 25 and the second plate 26 are removably attached, horizontally-extending apertures within the first member 20 may receive first fasteners 27 that extend through the first plate 25 and the second plate 26. Corresponding fastening nuts may also be secured at the distal threaded ends of the first fasteners 27 as shown in FIGS. 2-3. Securing the first and second plates 25, 26 about the clevis of the drawbar 13 and the first member 20 further prevents movement of the first member 20 with respect to the drawbar 13 of the vehicle 12.

As best shown in FIGS. 1-6, the first member 20 generally includes a vertical support 24 extending upwardly therefrom. Although the vertical support 24 may be comprised of various configurations, shapes, and materials, the vertical support 24 will preferably be comprised of an elongated metal bar or rod or as shown in the figures. The vertical support 24 may comprise various lengths and widths, but will preferably be of sufficient length to allow both the cam cover 69 of the cam unit 60 and the hydraulic housing 50 to be stacked in a vertical orientation as shown in the figures.

The vertical support 24 may extend upwardly from any position along the first member 20, such as the position adjacent to the first end 21 of the first member 20 shown in the figures. The vertical support 24 provides a mounting structure for the hydraulic housing 50 as best shown in FIGS. 1-6. The vertical support 24 will thus preferably be of an appropriate configuration, shape, size, and material to support the weight of the hydraulic housing 50 and its internal components.

As best shown in FIGS. 2 and 3, a second member 30 is attached to the first member 20. The second member 30 acts as a link between the first member 20 and the third member 40 in addition to acting as an anchor for the lift actuator 80 of the present invention. In a preferred embodiment, the second member 30 is pivotally attached to the first member 20 by a pivot hinge 34 and is adapted to be pivoted along a horizontal plane about a vertical axle to allow for turning by the towing vehicle 12 when pulling another object or vehicle 14. The second member 30 is preferably center-biased to remain aligned with the first member 20 to ensure that the present invention is easily aligned with an object or vehicle 14 to be connected and towed.

Figure 5:
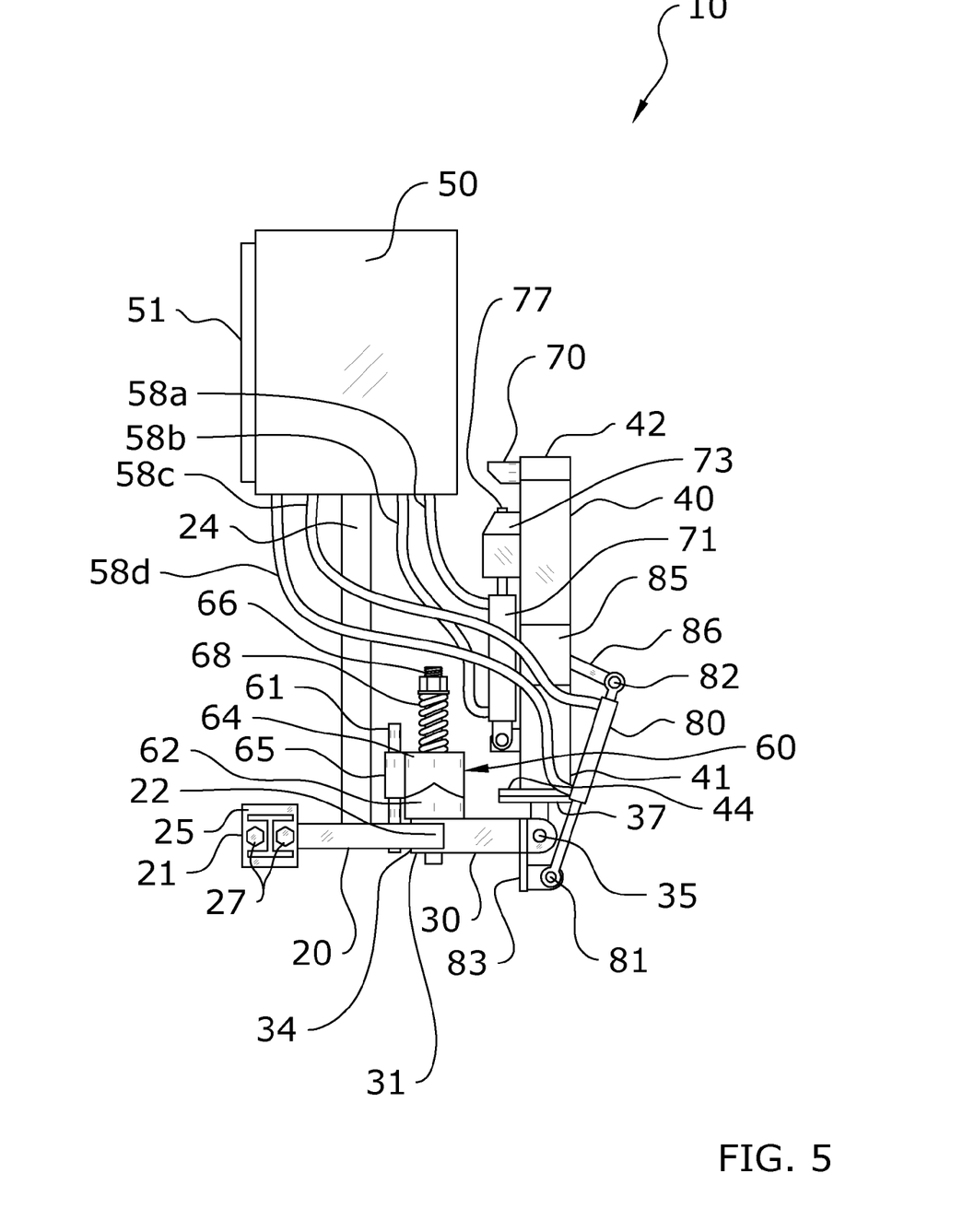
FIG. 5 is a side view of the present invention in a raised position.

The second end 32 of the second member 30 may include a lift hinge 35 which allows the third member 40 to be transitioned between a lowered horizontal position as shown in FIG. 4 and a raised vertical position as shown in FIG. 5. The second end 32 of the second member 30 may also include a first connector plate 37 which aids in linking the second member 30 with the third member 40 of the present invention by connecting with a corresponding second connector plate 44 on the first end 41 of the third member 40. In some embodiments, however, the connector plates 37, 44 may be omitted, with the third member 40 directly extending from the lift hinge 35.

As shown throughout the figures, a third member 40 is preferably pivotally attached to the second member 30 through usage of the lift hinge 35 and connector plates 37, 44, though other configurations may be utilized. The third member 40 generally comprises an elongated member having a first end 41 and a second end 42. The first end 41 of the third member 40 includes the second connector plate 44, which may be connected directly to the first connector plate 37, such as through usage of bolts, fasteners, welding, or other methods.

The third member 40 is adapted to be removably attached to an object or vehicle 14 to be towed by utilizing a catch member 70 and catch actuator 71 as described herein. The third member 40 is adapted to be pivoted upwardly into a raised storage position as shown in FIG. 4 and downwardly to a lowered position as shown in FIG. 5 of the drawings. The raised storage position allows for transporting the present invention upon a towing vehicle 12 without the present invention extending outwardly.

C. Hydraulic System

The present invention utilizes a self-contained hydraulic system which controls the catch and lift actuators 71, 80. This eliminates the need to utilize a vehicle's hydraulic system or allows for usage upon vehicles without a hydraulic system. The use of such a self-contained hydraulic system negates the need for hydraulics to be pulled from the towing vehicle 12. This allows the present invention to be utilized on a wide range of towing vehicles 12, including vehicles 12 which do not include on-board hydraulics.

Figure 6:
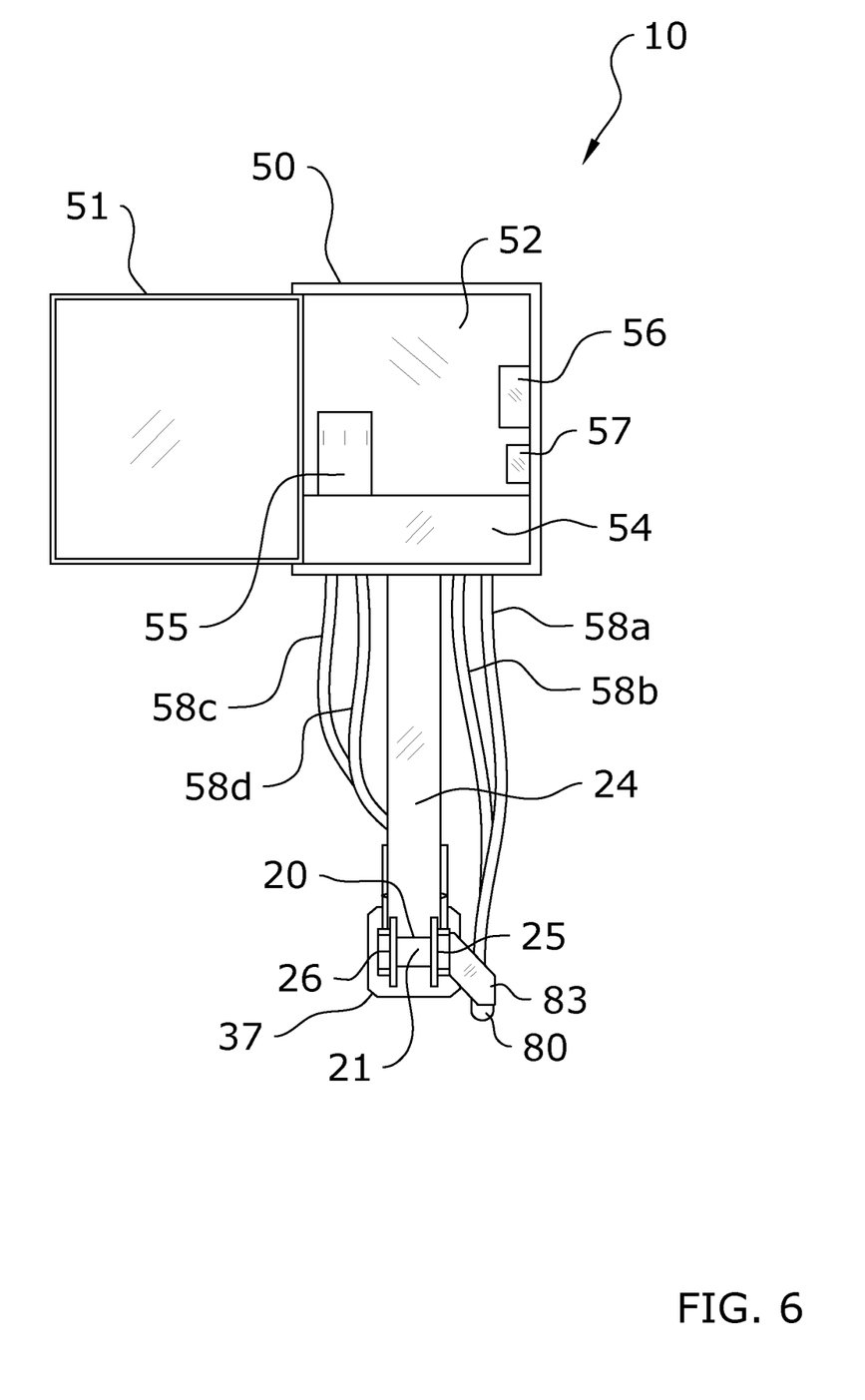
FIG. 6 is a back view of the present invention with the hydraulic housing in an opened position to expose its internal compartment.

As best shown in FIG. 6, the self-contained hydraulic system includes a hydraulic housing 50 comprising a box or other enclosure which includes an access door 51 providing selective access to an internal compartment 52. The internal compartment 52 of the hydraulic housing 50 stores and protects the various components of the hydraulic system which are utilized to operate the catch and lift actuators 71, 80 as described herein.

The hydraulic housing 50 may comprise various shapes, sizes, and configurations. In a preferred embodiment, the rectangular box configuration is utilized to protect the internal components within the internal compartment 52 and to provide ease-of-access through the access door 51. Various other configurations may be utilized for different embodiments and applications. The hydraulic housing 50 is generally mounted on the vertical support 24 which extends upwardly from the first member 20. The hydraulic housing 50 may, however, be mounted at various other locations on the present invention in different embodiments.

As best shown in FIG. 6, the internal compartment 52 of the hydraulic housing 50 stores a reservoir 54, a pump 55, and a control unit 56. The reservoir 54 is utilized to store a quantity of hydraulic fluid which is circulated to and back from the actuators 71, 80. Various types of reservoirs 54 may be utilized so long as the hydraulic fluid is adequately stored for circulation. In some embodiments, the reservoir 54 and pump 55 may be integrally formed.

The pump 55 circulates the hydraulic fluid through the conduits 58a-d and the actuators 71, 80. Various types of fluid pumps 55 may be utilized, including electric and/or gas pumps. The pump 55 should be of sufficient volume and strength to circulate the hydraulic fluids necessary to operate the present invention as well as fit within the hydraulic housing 50.

A control unit 56 may also be provided which controls activation and deactivation of the pump 55 to control the actuators 71, 80. Various types of control units 56 may be utilized, including valve mechanisms as well as integrated circuitry and microcontrollers. The vale mechanisms may be comprised of a valve box that controls the flow of the pressurized hydraulic fluid from the pump 55 to selected one or more conduits to control the hydraulic actuators and other hydraulic devices. The control unit 56 may be operated by controls within or extending from the hydraulic housing 50, such as a wired controller or control buttons extending from the housing 50. In other embodiments, the control unit 56 may be adapted to receive instructions wirelessly, such as through a remote controller.

As best shown in FIGS. 5 and 6, a plurality of hydraulic conduits 58a-d extend from the hydraulic housing 50 to provide hydraulic fluid to the actuators 71, 80. Generally, each actuator 71, 80 will include two hydraulic conduits 58a-d as shown in the figures. However, it should be appreciated that other configurations may be utilized (for example, a single hydraulic conduit 58 could in some embodiments act to both send out and return the hydraulic fluid to/from each of the actuators 71, 80.

In a preferred embodiment as shown in the figures, a first hydraulic conduit 58a and a second hydraulic conduit 58b are each connected between the hydraulic housing 50 and the catch actuator 71. The first hydraulic conduit 58a acts to transmit hydraulic fluid from the hydraulic system to the catch actuator 71. The second hydraulic conduit 58b acts to return hydraulic fluid from the catch actuator 71 to the hydraulic housing 50 to be stored in the reservoir 54 and later transmitted again using the pump 55.

Similarly, a third hydraulic conduit 58c and a fourth hydraulic conduit 58d are each connected between the hydraulic housing 50 and the lift actuator 80. The third hydraulic conduit 58c acts to transmit hydraulic fluid from the hydraulic system to the lift actuator 80. The fourth hydraulic conduit 58d acts to return hydraulic fluid from the lift actuator 80 to the hydraulic housing 50 to be stored in the reservoir 54 and later transmitted again using the pump 55.

D. Cam Unit

A cam unit 60 may be mechanically connected to the first member 20 and the second member 30 to provide a centering force to the second member 30. The centering force will act to retain the second member 30 in alignment with the first member 20 (preferably aligned longitudinally with the towing vehicle 12). The centering force preferably manipulates the second member 30 into substantial longitudinal alignment with the first member 20 as shown in FIG. 2.

The cam unit 60 may include an upper cam 64 which is positioned on top of a lower cam 62 as shown in the figures. The lower and upper cams 62, 64 are slidably engaged with one another. The lower surface of the upper cam 64 mirrors the lower surface of the lower cam 62 such that when the second member 30 is aligned with the first member 20, the cams 62, 64 are fully connected to prevent pivoting of the second member 30 without a significant application of force. Various types of cams 62, 64 may be utilized, such as the configuration shown in the figures.

The upper cam 64 is preferably concentric with respect to the lower cam 62 along a common vertical axis. A central shaft 66 preferably extends upwardly from the first member 20 through the lower cam 62 and the upper cam 64 as best shown in FIG. 2. The upper cam 64 preferably slides upon the central shaft 66 and the lower cam 62 is preferably stationary with respect to the second member 30. The lower cam 62 is preferably attached to the second member 30 and rotates with the second member 30 about the central shaft 66. The central shaft 66 preferably extends upwardly through the first member 20 and the second member 30 to form the pivot axis for the second member 30 with respect to the first member 20.

The lower and upper cams 62, 64 are biased towards one another by a bias member 68. The bias member 68 is preferably comprised of a compression spring positioned upon the central shaft 66 above the upper cam 64, wherein the bias member 68 is adapted to apply a downward force upon the upper cam 64. The compression spring is concentrically positioned about the central shaft 66 and is allowed to move along the central shaft 66. A fastening nut may be threadably attached to male threading upon the upper portion of the central shaft 66 thereby allowing the user to adjust the amount of compression force applied to the upper cam 64 as shown in the figures.

A guide shaft 61 may extend upwardly from the first member 20 as illustrated in the figures. The guide shaft 61 is preferably parallel with respect to the central shaft 66. The upper cam 64 is slidably connected to the guide shaft 61 to prevent rotation of the upper cam 64 with respect to the first member 20 as the lower cam 62 is rotated. The upper cam 64 preferably includes a guide arm 65 that extends outwardly, wherein the guide arm 65 is slidably connected to the guide shaft 61 and provides leverage to prevent rotation of the upper cam 64 during operation. A cam cover 69 comprised of a tubular structure with a lower opening is removably positioned over the lower cam 62 and the upper cam 64 to prevent physical injury or contamination of the cam unit 60.

E. Catch Unit

The present invention utilizes a catch unit for connecting to the towed vehicle 14, such as by its hitch 15. As shown in the figures, a catch unit extends from the third member 40 to catchably and releasably engage a hitch 15 on the towed vehicle 14. The catch unit is comprised of a catch member 70 that extends upwardly from the second end 42 of the third member 40 and is extendable through a hitch 15 (e.g. a loo) attached to the towed vehicle 14.

A catch actuator 71 is attached to the third member 30 that selectively extends and retracts an engaging member 77 to engage the catch member 70. When the engaging member 77 is fully extended, the catch member 70 is prevented from escaping from the hitch 15 of the towed vehicle 14. U.S. Pat. No. 5,772,230 to Kemnitz illustrates an exemplary catch unit and is incorporated by reference herein to disclose the catch unit.

As shown in the figures, the catch actuator 71 preferably comprises a hydraulic cylinder, though other configurations may be utilized. The catch actuator 71 includes a first end 72 and a second end 73. The first end 72 of the catch actuator 71 is connected to an anchor 74 which extends from the third member 40 adjacent to its first end 41. The second end 73 of the catch actuator 71 extends through a guide member 75 comprised of a pair of opposing and parallel plates adapted to prevent the catch actuator 71 from being dislodged from its track on the third member 40. The second end 73 of the catch actuator 71 terminates as the engaging member 77 described herein.

As shown throughout the figures, a first hydraulic conduit 58a is connected between the hydraulic housing 50 and the first end 72 of the catch actuator 71. The first hydraulic conduit 58a acts to transmit hydraulic fluid into the catch actuator 71. A second hydraulic conduit 58b is connected between the hydraulic housing 50 and the second end 73 of the catch actuator 71. The second hydraulic conduit 58b acts to return hydraulic fluid from the catch actuator 71 back to the hydraulic housing 50.

F. Lift Unit

The present invention includes a lift unit for transitioning the present invention between a lowered horizontal configuration and a raised vertical configuration for storage. A lift actuator 80 is connected between the third member 40 and the second member 30 to pivot the third member 40 between the raised storage position and the lowered position. The lift actuator 80 may be comprised of various types of actuators, such as but not limited to a hydraulic cylinder.

The lift actuator 80 is distally spaced outwardly form a side of the third member 40 to avoid engagement with the second member 30 and the third member 40 during lifting of the third member 40. Thus, the first end 81 of the lift actuator 80 is connected to a mount support 83 which extends outwardly from the side of the second member 30. The mount support 83 comprises a bracket, bar, or other extension member which extends outwardly from the side of the second member 30 as shown in FIG. 2. The mount support 83 acts as a mounting point for the lift actuator 80 to be connected to the second member 30.

As best shown in FIG. 2, a lift box 85 extends from the side of the third member 40. Preferably, the lift box 85 and the mount support 83 extend outwardly in the same direction from the respective third and second members 40, 30. Both the lift box 85 and the mount support 83 act to ensure that the lift actuator 80 is sufficiently distally spaced outwardly from the side of the second and third members 30, 40 to avoid engagement therewith.

A linkage member 86 comprises a bar or other connector extends from the third member 40 as shown in the figures. The second end 82 of the link actuator 80 is pivotally or rotatably connected to the linkage member 86 as best shown in FIG. 2. Such a configuration ensures that the third member 40 may be raised and lowered with respect to the second member 30 without damaging the lift actuator 80, such as by having the lift actuator 80 come in contact with either of the second or third members 30, 40.

G. Operation of Preferred Embodiment

In use, the user connects the first member 20 to the drawbar 13 of the towing vehicle 12 using a pin and by attaching the plates 25, 26 about the sides thereof. The actuators 71, 80 of the present invention are fluidly connected to the hydraulic unit utilizing the hydraulic conduits 58a-d which extend from the hydraulic housing 50 to the actuators 71, 80 as shown in the figures.

Using the control unit 56, the operator of the towing vehicle 12 may activate the lift actuator 80 to lift the third member 40 into the raised storage position. Prior to the third member 40 being raised, the hydraulic control unit 56 causes the lift actuator 80 to extend. The pivotal connection between the second end 82 of the lift actuator 80 and the linkage member 86 extending from the third member 40 will act to raise the third member 40 when the lift actuator 80 is so activated as shown in FIGS. 4 and 5.

With the third member 40 in the raised position, the towing vehicle 12 may be transported or moved to another location for towing a towed vehicle 14. During transport, the cam unit 60 will ensure that the second member 30 does not drift from side to side too much to retainer the first and second members 20, 30 in alignment.

Figure 7A:
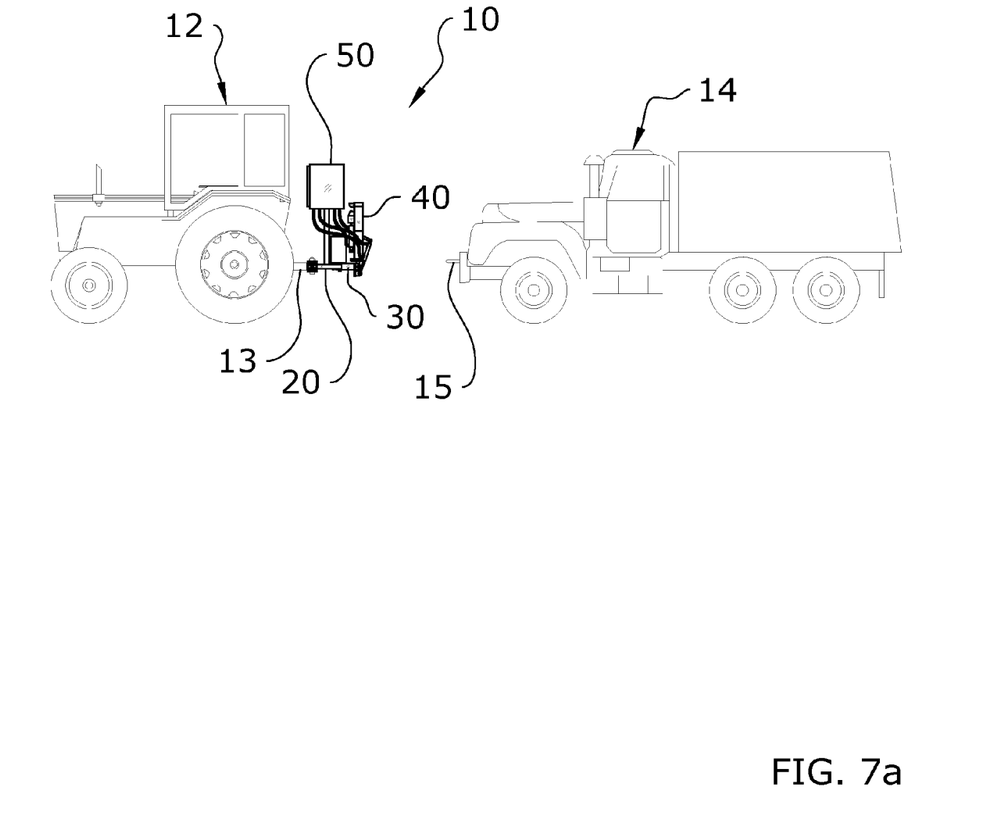
FIG. 7a is a side view of a towing vehicle aligned with a towed vehicle with the present invention in a raised position.
Figure 7B:
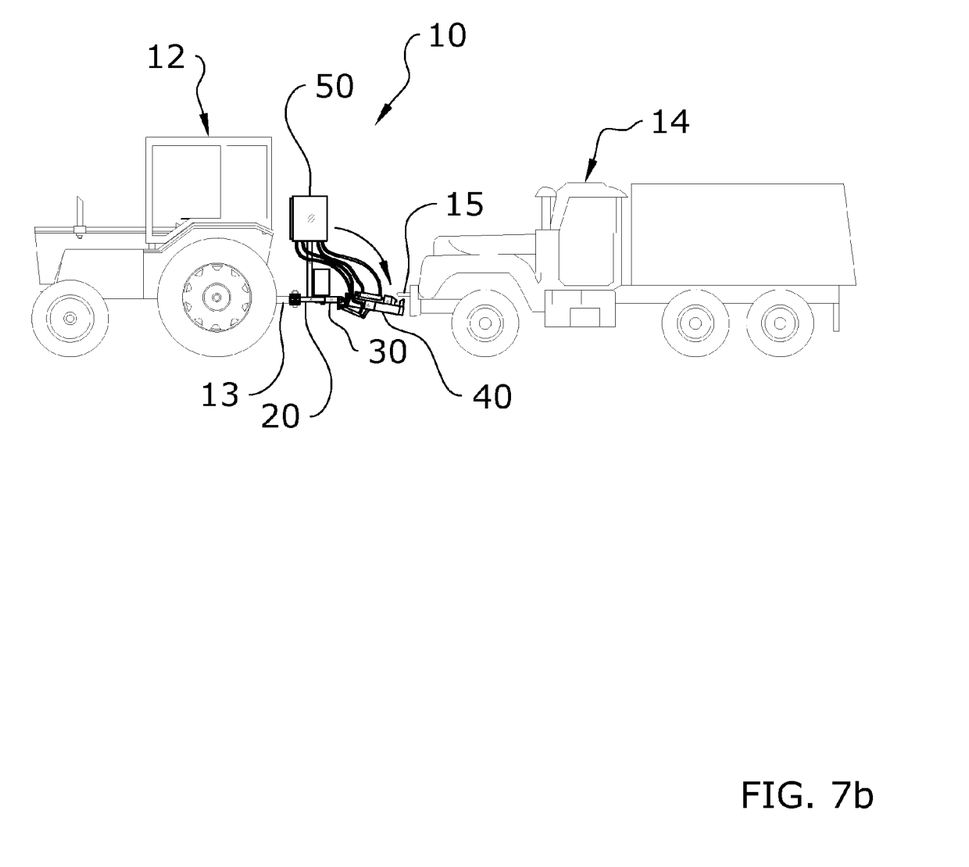
FIG. 7b is a side view of a towing vehicle aligned with a towed vehicle with the present invention in a lowered position prior to engagement with the towed vehicle.

To connect to the towed vehicle 14, the third member 40 is first lowered into its horizontal position after the towed vehicle 14 and towing vehicle 12 are properly positioned as shown in FIGS. 7a and 7b. The control unit 56 is activated to retract the lift actuator 80, which will cause the third member 40 to lower into its rested position (horizontally positioned in line with the second member 30) to be in line with the hitch 15 of the towed vehicle 14. With the third member 40 lowered to a level that allows for the catch member 70 to pass under the hitch 15 of the towed vehicle 14, the towing vehicle 12 then moves until the catch member 70 is positioned beneath the opening within the hitch 15, which generally comprises a loop or similar structure.

Figure 7C:
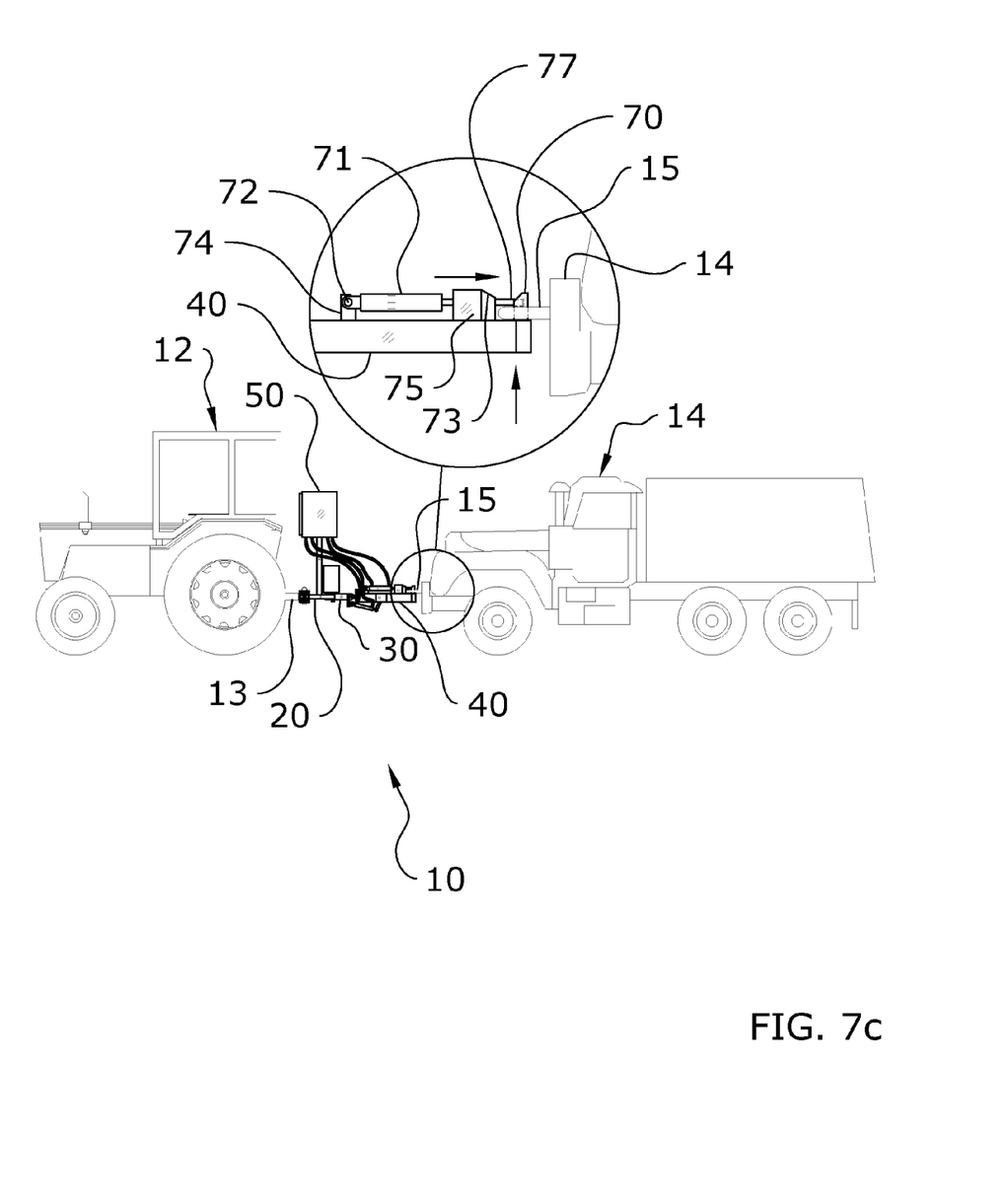
FIG. 7c is a side view and close-up view of a towing vehicle connected to a towed vehicle by the present invention.

The third member 40 may then be lifted upwardly so that the catch member 70 extends through the opening within the hitch 15. The catch actuator 71 is then activated through use of the control unit 56 to cause the engaging member 77 to advance toward and engage with the catch member 70 thereby catchably engaging the towed vehicle 14 as shown in FIG. 7c. Hydraulic fluid is transmitted through the hydraulic conduits 58c,d to so advance the catch member 70. The towing vehicle 12 is then able to pull the towed vehicle 14 as desired. When turning by the towing vehicle 12 is required, the cam unit 60 controls any necessary pivoting of the second member 30 with respect to the first member 20.

When towing is completed, the catch actuator 71 is again activated via the control unit 56 to retract the engaging member 77 so that the towed vehicle 14 may be released. The towing vehicle 12 may then be moved away from the towed vehicle 14 and the third member 40 returned to its raised storage position using the control unit 56 and lift actuator 80.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A hydraulic towing system, comprising:
   a towing device comprising a first member adapted to be connected to a towing vehicle and a second member adapted to be connected to a towed vehicle, wherein said first member and said second member are pivotally connected;
   a hydraulic housing mounted to said first member of said towing device, said hydraulic housing including a hydraulic system for raising said second member of said towing device into a first raised position and lowering said second member of said towing device into a second lowered position, wherein said hydraulic system includes a reservoir and a hydraulic pump;
   wherein said towing device includes a catch unit for connecting said towing device to said towed vehicle, wherein said catch unit includes a catch actuator for advancing and retracting an engaging member to connect to or release said towed vehicle; and
   a third hydraulic conduit fluidly connecting said catch actuator with said hydraulic system.

2. The hydraulic towing system of claim 1, wherein said towing device includes a vertical support extending upwardly from said first member of said towing device, wherein said hydraulic housing is mounted to said vertical support.

3. The hydraulic towing system of claim 1, wherein said towing device includes a lift actuator for raising and lowering said towing device.

4. The hydraulic towing system of claim 3, further comprising a first hydraulic conduit fluidly connecting said lift actuator with said hydraulic system.

5. The hydraulic towing system of claim 4, wherein said first hydraulic conduit is adapted to transmit a hydraulic fluid from said hydraulic system to said lift actuator.

6. The hydraulic towing system of claim 5, further comprising a second hydraulic conduit fluidly connecting said lift actuator with said hydraulic system.

7. The hydraulic towing system of claim 6, wherein said second hydraulic conduit is adapted to transmit said hydraulic fluid from said lift actuator to said hydraulic system.

8. The hydraulic towing system of claim 1, wherein said third hydraulic conduit is adapted to transmit a hydraulic fluid from said hydraulic system to said catch actuator.

9. The hydraulic towing system of claim 8, further comprising a fourth hydraulic conduit fluidly connecting said catch actuator with said hydraulic system.

10. The hydraulic towing system of claim 9, wherein said fourth hydraulic conduit is adapted to transmit said hydraulic fluid from said catch actuator to said hydraulic system.

11. A hydraulic towing system, comprising:
    a towing device comprising a first member, a second member pivotally connected to said first member, and a third member pivotally connected to said second member, wherein said first member is adapted to be mounted to a towing vehicle;
    a lift actuator connected between said second member and said third member for raising said third member into a first raised position with respect to said second member and lowering said third member into a lowered position with respect to said second member;
    a catch unit extending along said third member, said catch unit including a catch actuator and an engaging member for selectively connecting said third member to a towed vehicle when said third member is in said second lowered position;
    a hydraulic housing mounted to said first member of said towing device, said hydraulic housing including a hydraulic system for operating said lift actuator and said catch actuator.

12. The hydraulic towing system of claim 11, wherein said hydraulic system includes a reservoir, a hydraulic pump, and a control unit.

13. The hydraulic towing system of claim 12, further comprising a first hydraulic conduit fluidly connecting said catch actuator with said hydraulic system and a second hydraulic conduit fluidly connecting said catch actuator with said hydraulic system.

14. The hydraulic towing system of claim 13, further comprising a third hydraulic conduit fluidly connecting said lift actuator with said hydraulic system and a fourth hydraulic conduit fluidly connecting said lift actuator with said hydraulic system.

15. The hydraulic towing system of claim 14, wherein said first hydraulic conduit is adapted to transmit a hydraulic fluid from said hydraulic system to said catch actuator, wherein said second hydraulic conduit is adapted to return said hydraulic fluid from said catch actuator to said hydraulic system, wherein said third hydraulic conduit is adapted to transmit said hydraulic fluid from said hydraulic system to said lift actuator, wherein said fourth hydraulic conduit is adapted to return said hydraulic fluid from said lift actuator to said hydraulic system.

* * * * *